July 17, 1923.

T. C. ELLIS ET AL 1,461,770

SEED SOWING MACHINE

Filed July 6, 1922

INVENTORS
T. C. ELLIS
A. JEFFERY
H. MADDOCKS
By McLaughlin Atty.

Patented July 17, 1923.

1,461,770

UNITED STATES PATENT OFFICE.

THOMAS CHARLES ELLIS, ALFRED JEFFERY, AND HARRY MADDOCKS, OF PETERBOROUGH, ENGLAND.

SEED-SOWING MACHINE.

Application filed July 6, 1922. Serial No. 573,157.

*To all whom it may concern:*

Be it known that we, THOMAS CHARLES ELLIS, ALFRED JEFFERY, and HARRY MADDOCKS, all subjects of the King of Great Britain and Ireland, and all residents of Peterborough, county of Northampton, England, have invented a certain new and useful Improvement in Seed-Sowing Machines, of which the following is a specification.

The present invention relates to seed sowing machines of the kind wherein the seeds, fed from a common hopper, fall into recesses or pockets in a distributing drum or wheel, and are carried to a delivery mouth located vertically above a coulter, said recesses or pockets being adjustable, as to space area, to suit various classes, and consequently sizes of seeds.

The present invention has for its object the improved construction and arrangement of a seed sower of the above kind as hereinafter described, pointed out in the appended claims, and illustrated by the accompanying sheet of drawings, wherein:—

Like letters of reference indicate corresponding parts in said figures.

Figure 1:
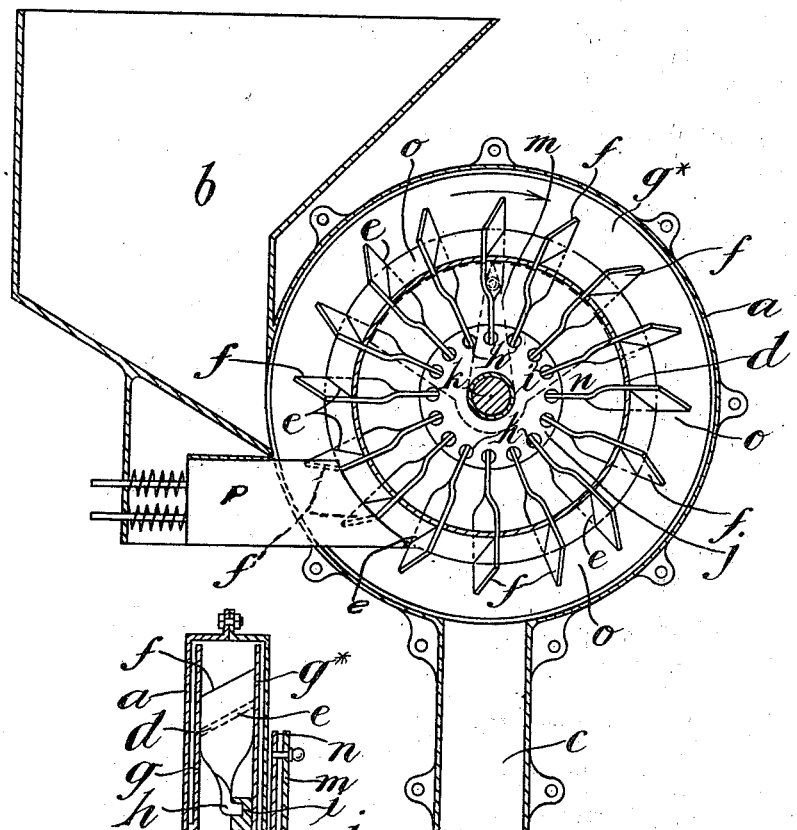
Figure 1 is a longitudinal vertical sectional view of the improved seed sower.
Figure 2:
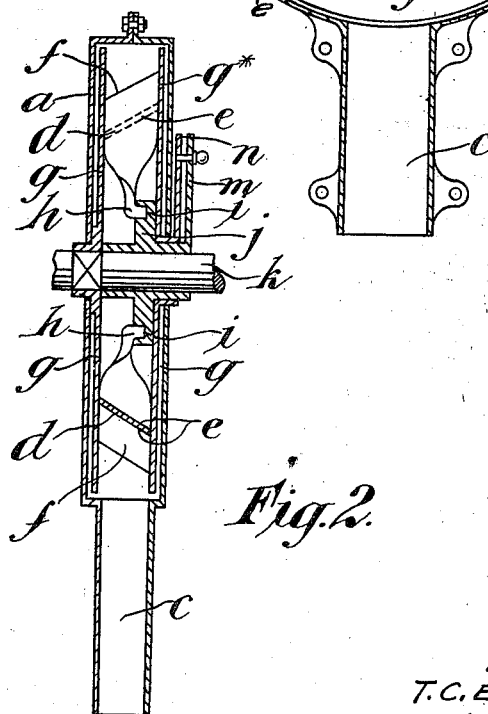
Figure 2 is a vertical transverse sectional view thereof.

In carrying out the invention, and referring to the drawings, the improved seed sower consists of an approximately circular and flat casing $a$ provided on one side, and extending above said casing $a$, with a hopper $b$, and at its lower centre position with a delivery mouth $c$.

Rotatably mounted in said casing $a$ in a vertical position is a hollow conical shaped drum or seed wheel $d$ provided with a series of diagonally disposed slots $e$ in its periphery and in each of said slots $e$ takes, in a slidable manner a palette or plate $f$, said palette or plate $f$ and its slot $e$ being bounded by the side plates $g$, $g^*$ of said drum or seed wheel.

The inner end $h$ of each palette or plate $f$ is pivotally mounted in a hole $i$ in a circular plate $j$ rotatable on the road wheel axle $k$ of the seed sower, and this circular plate $j$ is, exterior of the casing $a$, provided with a pointer $m$ adapted to be traversed by hand over a dial $n$ fixedly connected to the inner plate $g^*$ of the drum or seed wheel $d$, the arrangement being such that according as said pointer $m$ is traversed over the dial $n$, so are the palettes or plates $f$ extended or brought nearer to the periphery of the drum or wheel $d$, consequently varying the space area of the recesses or pockets $o$ into which, as said drum or seed wheel $d$ rotates, the seeds drop from the hopper $b$, a spring-controlled guard $p$ being provided to prevent the backward flow of seeds.

By forming the drum or wheel $d$ in conical shape and arranging the blades $f$ diagonally or on a skew thereto, small seeds have a tendency to go to the lower part of the pocket and so mount up and fall back to the hopper feed, thus ensuring the palettes or blades gauging the right quantity of seed and at the same time facilitating the picking up of said seeds.

We claim:—

1. A seed sowing device including a casing comprising side plates, a hollow frusto-conical drum having peripheral slots arranged between said plates, and a series of pallets slidably adjustable through said slots to form adjustable pockets for the reception of the seed to be sown.

2. A seed sowing device including a casing comprising plates, a hollow frusto-conical drum provided with a series of diagonally disposed slots, and a series of pallets having oblique end portions adjustable through the slots in the drum to provide pockets for the reception of the seed to be sown.

3. A seed sowing device including a casing comprising side plates, a hollow frusto-conical drum mounted between the side plates and having slots in its periphery, a plate within the drum and circumferentially adjustable with reference thereto, said plate having sockets, pallets having their inner ends pivotally mounted in the sockets of said circular plate, and means exterior of the casing and connected to said plate whereby the latter may be adjusted to effect the in and out movement of the pallets with reference to the drum to vary the area of the pockets formed between the drum and the casing.

In testimony whereof we have affixed our signatures hereto this 17th day of June, 1922.

THOMAS CHARLES ELLIS.
ALFRED JEFFERY.
HARRY MADDOCKS.